United States Patent [19]
Pennella

[11] Patent Number: 5,984,111
[45] Date of Patent: Nov. 16, 1999

[54] BICYCLE RACK

[76] Inventor: Joe Pennella, 444 Parliament St., Toronto, Canada, M5A 3A2

[21] Appl. No.: 09/241,873

[22] Filed: Feb. 2, 1999

[51] Int. Cl.[6] ...................................................... A47F 7/00
[52] U.S. Cl. ............................... 211/5; 211/19; 211/94.01
[58] Field of Search ................................. 211/4, 5, 18, 19, 211/94.01, 87.01

[56] References Cited

U.S. PATENT DOCUMENTS

| | | | |
|---|---|---|---|
| 3,970,197 | 7/1976 | Bale | 211/5 |
| 4,015,718 | 4/1977 | Bernard | 211/5 |
| 4,352,432 | 10/1982 | Smith | 211/5 X |
| 5,292,009 | 3/1994 | Smith | 211/19 X |
| 5,323,915 | 6/1994 | Fortune | 211/5 |
| 5,549,231 | 8/1996 | Fletcher et al. | 211/19 X |

*Primary Examiner*—Robert W. Gibson, Jr.

[57] ABSTRACT

The present invention provides for a bicycle rack, which is capable of securely locking bicycles to the rack. The rack comprises a channel member for holding the wheels of the bicycle, the channel member being provided with holes in the region where the bicycle wheels are to be located. The bicycle rack further is provided with a slideable locking member, the slideable locking member having a generally extended U shape and having a central bar region joining two end bars which are insertable through the holes in the channel member. The slideable locking member is movable between a first unlocked position where the end bars are free of the interior of the channel member to allow the bicycle wheels to be located within the channel member and a second locked position where the end bars extend across the interior of the channel and hold the bicycle wheels within the channel member.

5 Claims, 5 Drawing Sheets

BICYCLE RACK

FIELD OF THE INVENTION

The present invention relates to racks for holding bicycles and in particular to racks for holding bicycles, which can be used in either a horizontal or vertical position and in which the bicycles may be securely locked.

BACKGROUND OF THE INVENTION

There have been many designs of bicycle racks developed with the intention of securely holding bicycles and enabling them to be locked to the rack. Examples of some such designs are shown in U.S. Pat. No. 3,865,244, 3,964,611, 4,136,782, 4,416,379, 5,292,009 and 5,690,259.

U.S. Pat. Nos. 3,865,244 and 3,964,611, both to Galen and Vanderpoel, describe a bicycle rack for supporting a bicycle having a channel member for receiving the front and rear wheels of the bicycle. The bicycle rack has a supporting section fixed to the channel number and a pivotally mounted clamping mechanism for clamping the frame of the bicycle to the support member against movement relative to the support member. Wheel locking bars also provided for clamping the front and rear wheels in the channel member.

U.S. Pat. No. 4,136,782, describes a wall-mounted rack for storing a bicycle. The rack has a horizontal bracket mounted to a wall, the bracket being just wider than the tire of the bicycle to be stored. The rack is also provided with a rail perpendicular to the bracket mounted to the wall, the rail being provided with a slide that can be adjusted along the vertical length of the rail and a hook for suspending the bicycle with the wheels placed upon the horizontal bracket hinged to the slide.

U.S. Pat. No. 4,416,379, describes a bicycle storage device having a wheel-receiving channel adapted to receive the front and rear wheels of the bicycle. The device is provided with a bicycle wheel-engaging hook mounted on one end of the channel to engage the front wheel of the bicycle and support the bicycle within the channel.

U.S. Pat. No. 5,292,009, describes a bicycle rack having channel member with a wall on one side and a stepped base. The bicycle rack has a retaining and locking means o hold a bicycle within the rack.

U.S. Pat. No. 5,690,259, describes a modular bicycle rack system useful for a vehicle having a pair of rooftop transverse load bars spaced along the length of the vehicle. The rack system includes a channel member for containing the wheels of the bicycle and clamping members for clamping the wheels within the channel member and for clamping the frame to the modular bicycle rack system.

There still remains a need for a simple to use bicycle rack which enables storage of a bicycle and which is capable of allowing the bicycle to be locked to the rack.

SUMMARY OF THE INVENTION

The present invention provides for a bicycle rack, which is capable of securely locking bicycles to the rack. The rack comprises a channel member for holding the wheels of the bicycle, the channel member being provided with holes in the region where the bicycle wheels are to be located. The bicycle rack further is provided with a slideable locking member, the slideable locking member having a generally extended U shape and having a central bar region joining two end bars which are insertable through the holes in the channel member. The slideable locking member is movable between a first unlocked position where the end bars are free of the interior of the channel member to allow the bicycle wheels to be located within the channel member and a second locked position where the end bars extend across the interior of the channel and hold the bicycle wheels within the channel member.

In an aspect of the invention, the slideable locking member is provided with a locking region extending perpendicular of the central bar region. The channel member is also provided with a locking region extending perpendicular to the channel member. The two locking regions are capable of accepting a lock to lock a bicycle to the bicycle rack.

BRIEF DESCRIPTION OF THE DRAWINGS

Preferred embodiments of the present invention are illustrated in the attached drawings in which.

DETAILED DESCRIPTION OF THE PREFERRED EMBODIMENTS

Figure 1:
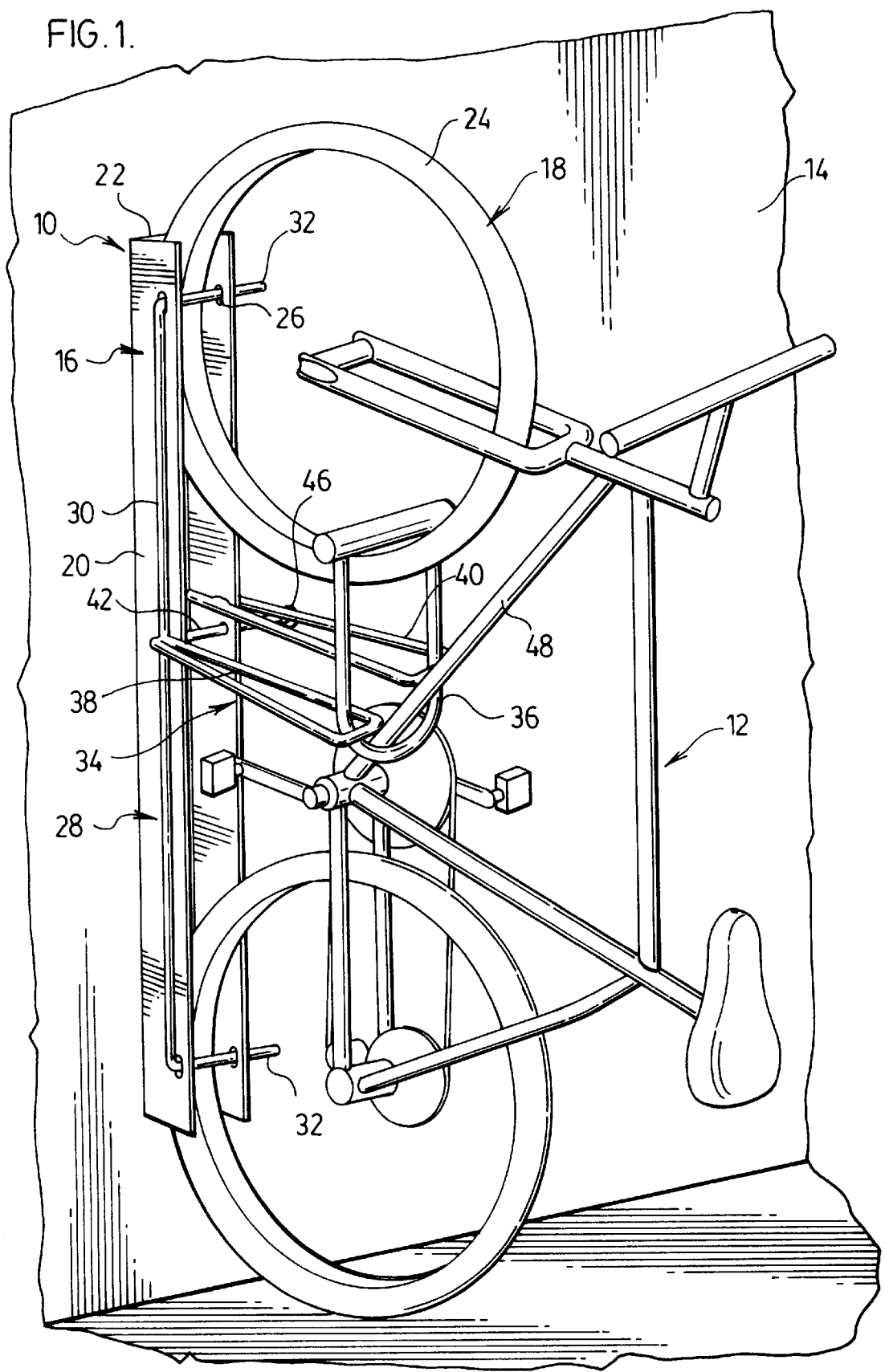
FIG. 1 is a perspective view of a bicycle rack of the present invention attached to a wall and holding a bicycle.
Figure 2:
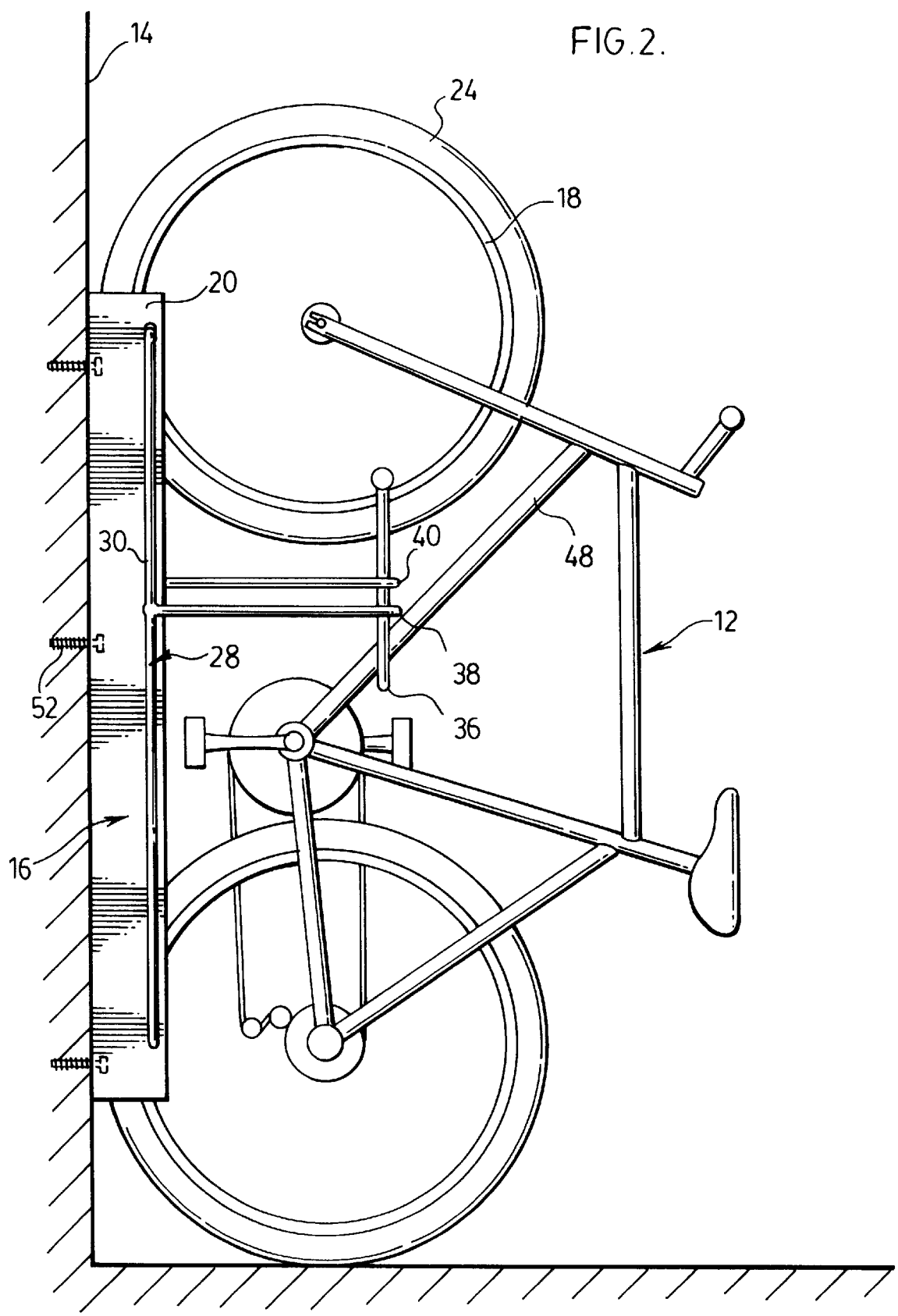
FIG. 2 is a side elevation view of the bicycle rack of FIG. 1.
Figure 3:
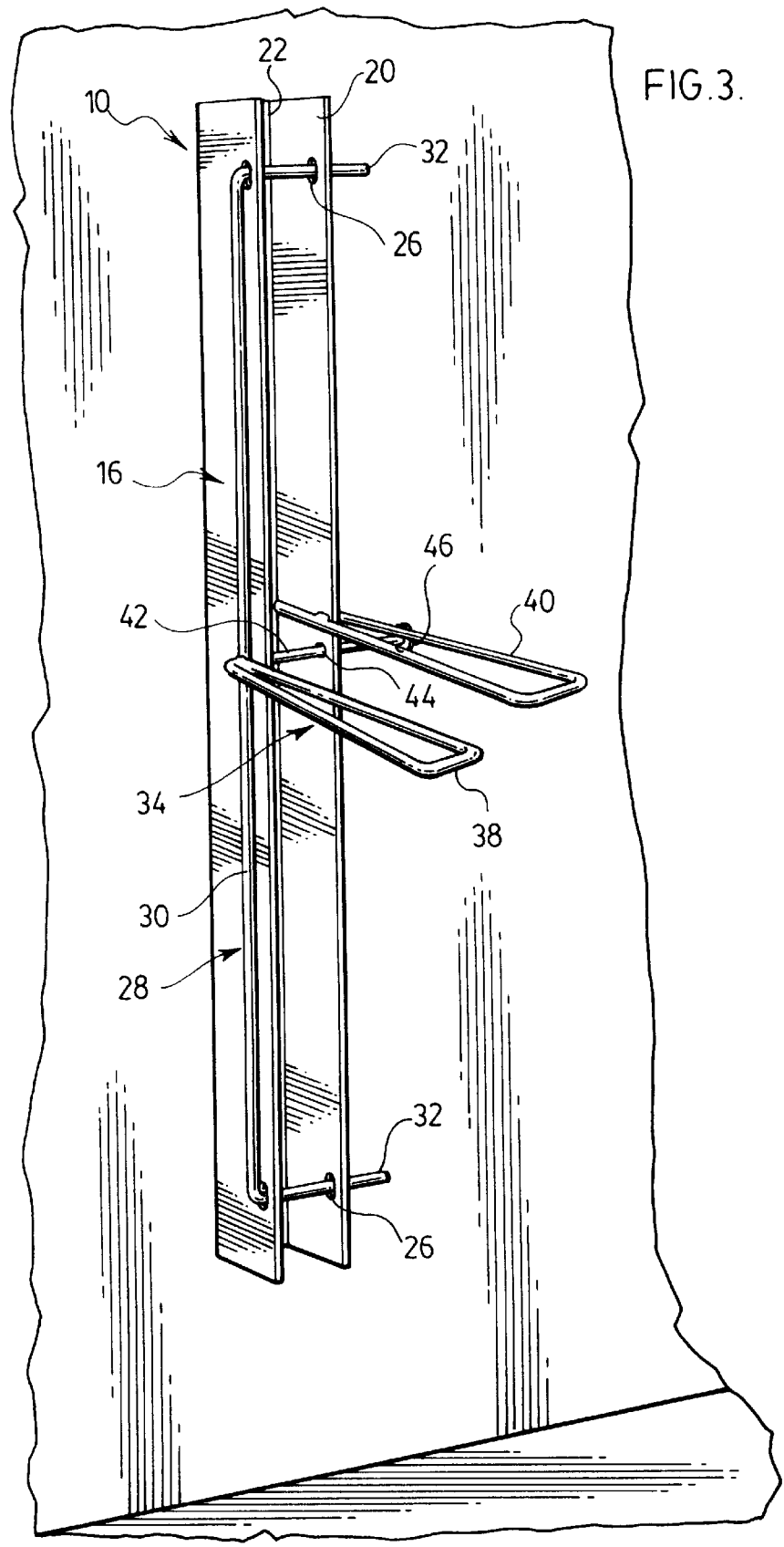
FIG. 3 is a perspective view of the bicycle rack of FIG. 1 without a bicycle.

A preferred embodiment of a bicycle rack 10 of the present invention is illustrated in the attached figures. As shown in FIG. 1, the bicycle rack 10 is designed to hold and allow for locking of a bicycle 12. The bicycle rack 10 illustrated in the figures is shown attached to a wall 14, however the rack 10 is also easily adapted to either being attached to a floor or may be provided as part of a stand-alone unit.

Bicycle rack 10 has a channel member 16 for holding the wheels 18 of the bicycle 12. The channel member 16 is preferably a U-shaped member with spaced apart sides 20 connected by a base 22. The sides 20 of the channel member 16 are spaced apart a width sufficient to accommodate the tires 24 on the wheels 18 of the bicycle 12. The length of the channel member 16 is sufficient to accommodate both the wheels 18 of the bicycle 12 within the channel member 16.

The bicycle rack 10 is also provided with a slideable wheel locking means 28 to releasably hold and lock a bicycle 12 to the bicycle rack 10. Wheel locking means 28 preferably has a generally extended U shape having a central bar region 30 joining two end locking bars 32. End locking bars 32 are insertable through holes 26 provided in the side walls 20 of the channel member 16 in the area where the bicycle wheels 18 are to be located. The end locking bars 32 of the wheel locking means 28 are of a length slightly greater than the width of the channel member 16 of the bicycle rack 10. The operation of the wheel locking means 28 and the end locking bars 32 will be further explained in detail below.

The bicycle rack is also provided with a lock attachment means 34 which extends either side of the bicycle 12 and to which a suitable lock 36 can be attached to lock the bicycle 12 to the bicycle rack 10. As illustrated in the figures, preferably the lock attachment means 34 is provided by two vertically extending formed metal bars 38 and 40 which sandwich the bicycle 12 between them. One of the metal bars 38 is attached to the central bar 30 of the wheel locking means 28 and the second metal bar 40 is attached to the side wall 20 of the channel member 16 opposite the wheel locking means 28. The vertically extending bars 38 and 40 are provided with a means for holding the lock 36. Preferably, as illustrated in the figures, the vertical bars 38 and 40 are provided as a closed loop, the lock 36 being able to be inserted through the opening formed by the closed loop. It will however, be apparent to those skilled in the art that other means for holding the lock in a secure position are possible.

The wheel locking member 28 is also provided with a third extending bar 42 centrally located off the locking member 28 and extending through openings 44 in the side walls 20 of the channel member 16. This centrally extending bar 42 is of a length greater than the length of the two locking end bars 32 and is provided with a stop cap 46 on its end, the purpose of which will be explained below. Centrally extending bar 42 may be provided as an extension of the vertical bar 38 by bending the end of the vertical bar 38 at 90 degrees to form the centrally extending bar 42 and then attaching the combined vertical bar 38 and centrally extending bar 42 to the central bar 30 of the wheel locking means 28.

Figure 4:
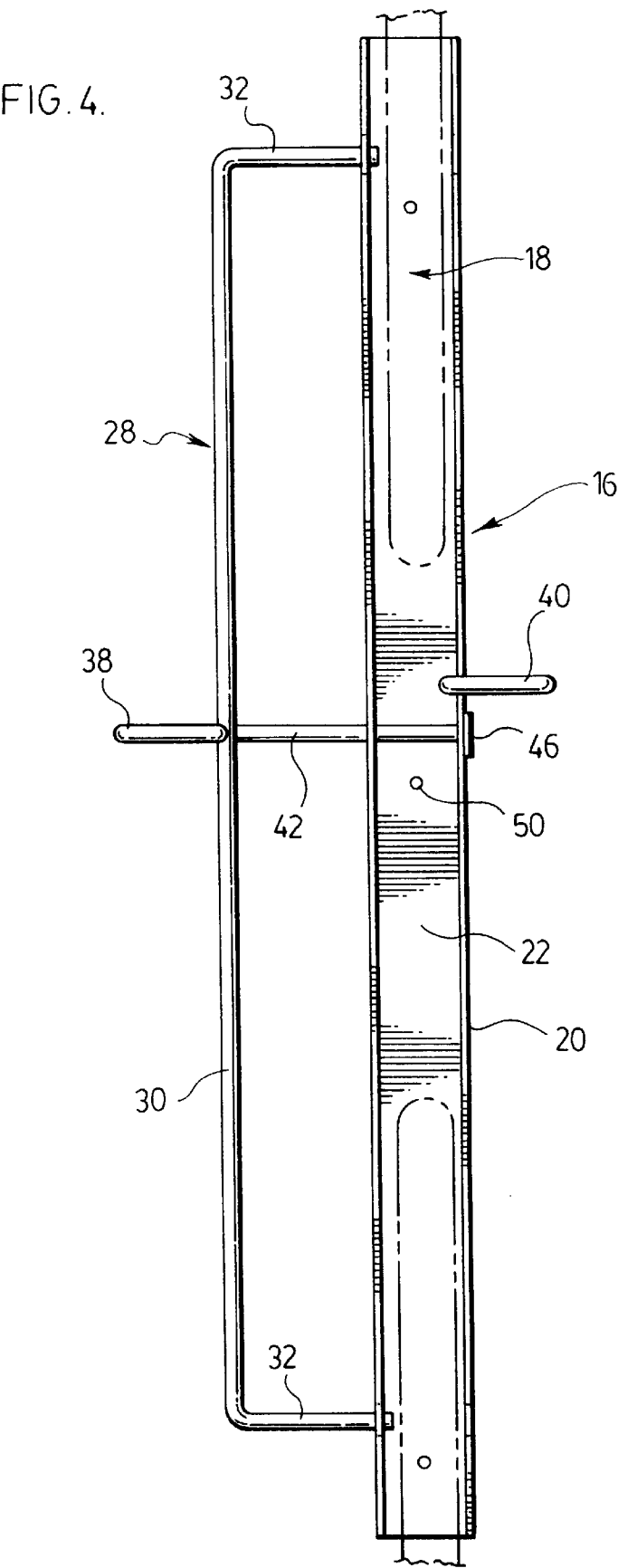
FIG. 4 is a top plan view of the bicycle rack of FIG. 1 in the open position.
Figure 5:
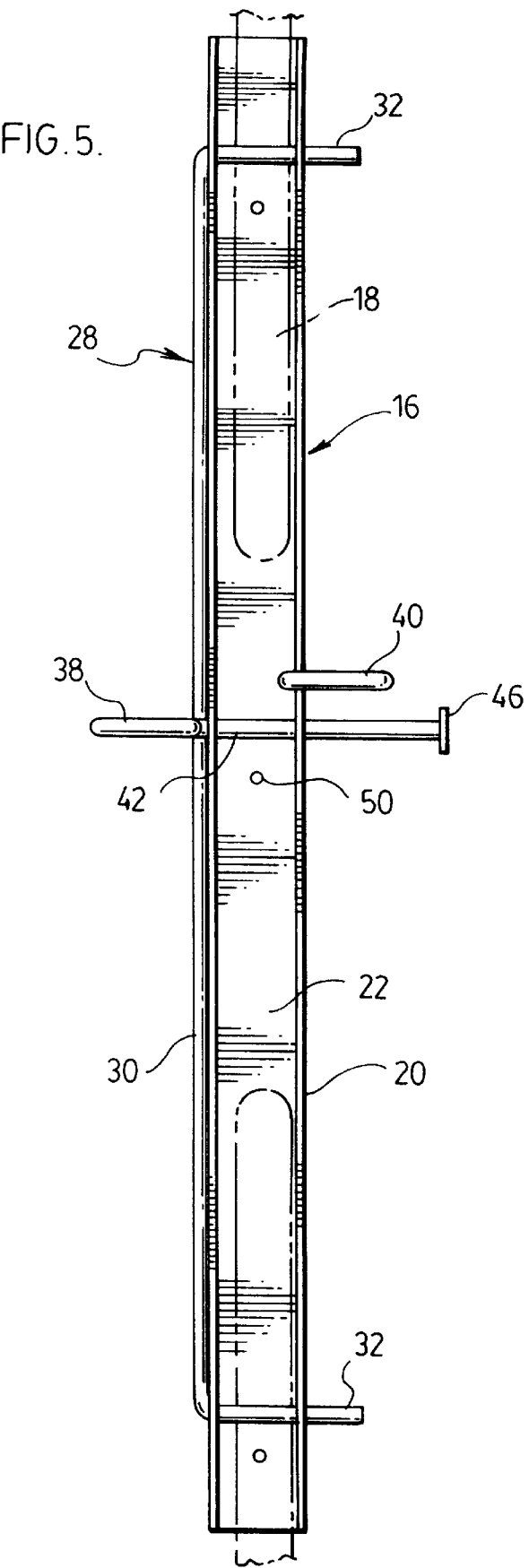
FIG. 5 is a top plan view of the bicycle rack of FIG. 1 in the closed position.

The operation of the bicycle rack 10 of the present invention will now be described with particular reference to FIGS. 4 and 5. The bicycle rack 10 as shown in FIG. 4 is in the open position ready to accept a bicycle 12.

This open position is achieved by moving the wheel locking means 28 laterally away from the channel member 16 until the stop cap 46 on the centrally extending bar 42 stops up against the outside of the side wall 20 of the channel member 16. This lateral movement moves the two end locking bars 32 free of the channel member 16 such that the interior of the channel member 16 is clear. A bicycle 12 is then placed into the rack 10 by placing the wheels 18 into the channel member 16 in the region of the openings 26 and the end locking bars 32. The wheel locking means 28 is then moved laterally toward the channel member 16. This lateral movement moves the end locking bars 32 through the interior of the channel member 16 until they pass through the holes 26 in the side wall 20 opposite the wheel locking means 28. The wheels 18 of the bicycle 12 are then trapped between the end locking bars 32 and the base 22 of the channel member 16 securely holding the bicycle 12 in the bicycle rack 10. A suitable lock 36 may then be placed through the loops of the vertically extending bars 38 and 40 and around part of the frame 48 of the bicycle 12. If desired, depending upon the nature of the lock 36, the lock may also be passed through one of the wheels 18 of the bicycle 12. In this way, the bicycle is securely locked to and held by the bicycle rack 10 by use of a single lock. The one lock 36 secures the wheels 18 to the rack 10 and locks the frame 48 and wheel 18 to the rack 10 as well.

As described above, the figures illustrate the bicycle rack 10 attached to a wall 14. The base 22 of the channel member 16 is preferably provided with holes 50, which can be used for bolts or screws 52 to attach the bicycle rack 10 to a wall 14. In a similar manner, holes 50 may also be used for suitable screws or bolts 52 to attach the bicycle rack to a floor or other supporting structure.

The bicycle rack of the present invention provides for a simple to use bicycle rack which enables storage of a bicycle and which is capable of allowing the bicycle to be securely locked to the rack with only a single lock. The bicycle rack is simple to use as a simple lateral movement of the wheel locking means holds and releases the bicycle. The provision of the centrally extending bar and stop cap holds the wheel locking means in the open position. The vertically extending bars allow a lock to be easily attached to the rack and the bicycle.

The bicycle rack of the present invention is also easy and economical to manufacture requiring only a channel member and metal bar stock for the various locking means. In the preferred embodiment illustrated in the figures, the bicycle rack requires three pieces of metal bar stock, which are bent and welded to form the locking means of the bicycle rack. One piece of bar stock is bent into the U shape to form the slideable wheel locking means with its central bar and attached end locking bars. A second piece of bar stock is bent to form the first vertically extending bar and attached central extending bar. This combined structure is then welded to the wheel locking means. Once the wheel locking means and attached vertically extending bar are inserted into the channel member, the stop cap is attached to the central extending bar. The third piece of bar stock is bent to form the other vertically extending bar, which is then welded to the side of the channel member.

Although various preferred embodiments of the present invention have been described herein in detail, it will be appreciated by those skilled in the art that variations may be made thereto without departing from the spirit of the invention or the scope of the appended claims.

The embodiments of the invention in which an exclusive property or privilege is claimed are as follows:

1. A bicycle rack capable of securely locking bicycles to the rack, the rack comprising a channel member for holding the wheels of the bicycle, the channel member being provided with holes in the region where the bicycle wheels are to be located and a slideable locking member, the slideable locking member being generally U shaped and having a central bar region joining two end bars which are insertable through the holes in the channel member, the slideable locking member being movable between a first unlocked position where the end bars are free of the interior of the channel member to allow the bicycle wheels to be located within the channel member and a second locked position where the end bars extend across the interior of the channel and hold the bicycle wheels within the channel member.

2. A bicycle rack according to claim 1 wherein the slideable locking member is provided with a first locking region extending vertically of the central bar region and a second locking region extending vertically to the channel member, the two locking regions being capable of accepting a lock to lock a bicycle to the bicycle rack.

3. A bicycle rack according to claim 2 wherein the slideable locking member is provided with a centrally located extending bar of a greater length than the end bars, the centrally located extending bar being slideable in holes provided in the channel member.

4. A bicycle rack according to claim 3 wherein the centrally located extending bar is provided with a stop cap on the end distal the slideable locking member, the stop cap resting against the side of the channel member when the slideable locking member is in the first unlocked position.

5. A bicycle rack according to claim 4 wherein the two locking regions extending vertically the central bar region and the channel member are provided with a closed loop for accepting a lock.

* * * * *